(12) United States Patent
Otake et al.

(10) Patent No.: US 7,247,661 B2
(45) Date of Patent: Jul. 24, 2007

(54) MASTERBATCH PELLET MIXTURE

(75) Inventors: Haruo Otake, Ageo (JP); Yoshiro Tomita, Tatebayashi (JP); Hideki Uchimi, Tatebayashi (JP); Youko Nakayama, Osaka (JP)

(73) Assignee: Dainippon Ink and Chemical, Inc., Tokyo (JP)

( * ) Notice: Subject to any disclaimer, the term of this patent is extended or adjusted under 35 U.S.C. 154(b) by 266 days.

(21) Appl. No.: 10/509,674

(22) PCT Filed: Apr. 28, 2004

(86) PCT No.: PCT/JP2004/006195

§ 371 (c)(1),
(2), (4) Date: Oct. 8, 2004

(87) PCT Pub. No.: WO2004/096897

PCT Pub. Date: Nov. 11, 2004

(65) Prior Publication Data

US 2005/0245685 A1  Nov. 3, 2005

(30) Foreign Application Priority Data

Apr. 30, 2003  (JP) .............................. 2003-125095

(51) Int. Cl.
*C08L 23/04* (2006.01)
*C08L 23/18* (2006.01)
*C08J 3/22* (2006.01)

(52) U.S. Cl. ...................... 523/206; 523/207; 523/210; 523/221; 523/351; 523/440

(58) Field of Classification Search ................ 523/206, 523/207, 210, 221, 351, 440
See application file for complete search history.

(56) References Cited

U.S. PATENT DOCUMENTS 4,786,678 A * 11/1988 Dobreski et al. ........... 524/528

6,022,924 A * 2/2000 Akao et al. ................. 524/495

FOREIGN PATENT DOCUMENTS

| JP | 62-009915 | | 1/1987 |
|---|---|---|---|
| JP | 7-102155 | | 4/1995 |
| JP | 7 102155 | * | 4/1995 |
| JP | 7-216099 | | 8/1995 |
| JP | 7216099 | * | 8/1995 |
| JP | 11-279282 | | 10/1999 |
| JP | 11302390 A | * | 11/1999 |

OTHER PUBLICATIONS

European Search Report dated Feb. 9, 2005, for PCT/JP04/06195, Apr. 28, 2004.

* cited by examiner

*Primary Examiner*—James J. Seidleck
*Assistant Examiner*—Olga Asinovsky
(74) *Attorney, Agent, or Firm*—Armstrong, Kratz, Quintos, Hanson, & Brooks, LLP.

(57) ABSTRACT

A mixture including a high specific gravity masterbatch pellets group (A) with specific gravity within a range from 1.8 to 3.5, and a low specific gravity masterbatch pellets group (B) with specific gravity within a range from 0.5 to 1.6. The high specific gravity masterbatch pellets group (A) comprises m different columnar masterbatch pellets, each with a different specific gravity, and the low specific gravity masterbatch pellets group (B) comprises n different columnar masterbatch pellets, each with a different specific gravity. The high specific gravity masterbatch pellets group (A) and the low specific gravity masterbatch pellets group (B) satisfy a formula (1) shown below:

$$0.5 \text{ (mm}^{-1}) \leq \sum_{p=1}^{m}\left(\frac{Hp}{Sp} \times Rp\right) - \sum_{q=1}^{n}\left(\frac{Hq}{Sq} \times Rq\right) \leq 12 \text{ (mm}^{-1}). \quad (1)$$

3 Claims, No Drawings

MASTERBATCH PELLET MIXTURE

BACKGROUND OF THE INVENTION

1. Field of the Invention

The present invention relates to a masterbatch pellet mixture. Priority is claimed on Japanese Patent Application No. 2003-125095, filed Apr. 30, 2004, the content of which is incorporated herein by reference.

2. Description of Related Art

When compounding agents such as dyes, pigments or other additives are added to and mixed with a resin material, a method is used wherein first the entire quantity of the compounding agent is added to a small quantity of the resin material, and is carefully mixed and dispersed to generate a high concentration material, and the majority of the resin material is then added to this high concentration material to generate a product with the target concentration. This method offers certain advantages including the fact that the dispersion and mixing is completed within a short time period, and the fact that the process can be managed with ease. This high concentration compound material is called a masterbatch. In those cases where a thermoplastic resin is used as the aforementioned resin material, pellet-like masterbatches, which are produced by adding a high concentration of a compounding agent to the thermoplastic resin and then mixing to generate a uniform mixture, are already known. In the present invention, the resin used to adjust the masterbatch to the target concentration is termed the additional resin.

In a typical method of using masterbatch pellets, the masterbatch pellets and the additional resin pellets are first mixed together in a mixing device such as a tumbler mixer, and the resulting mixture is then supplied to a molding apparatus.

Examples of methods of supplying the aforementioned mixture of the masterbatch pellets and the additional resin pellets to the molding apparatus include free fall methods and air blow feeding methods. The problem that arises is that during supply of the pellet mixture to the molding apparatus, the pellet mixture separates and become non-uniform, depending on factors such as the transport distance and the method used, and as a result, the molded product develops compositional irregularities, making it impossible to produce a product with uniform coloring and functionality. Conventionally, the method typically employed to prevent this type of separation of the different pellets is that all the pellets are of substantially the same shape and size.

Furthermore, another method used for preventing separation is the method described below. This method uses a separate supply system wherein the masterbatch pellets and the additional resin pellets are not premixed, but are rather supplied separately to the molding apparatus using separate supply devices, and the masterbatch pellets and the additional resin pellets are then mixed immediately prior to entry into the material supply port of the molding apparatus. In this method, because the mixing of the masterbatch pellets and the additional resin pellets is conducted immediately prior to entry into the material supply port of the molding apparatus, separation of the pellets can be suppressed.

However, in recent years, demands for high functionality of molded products has increased significantly, resulting in a large increase in the number of different masterbatches containing specified additives. Furthermore, molded products of all different hues are now demanded, and therefore the number of different masterbatches containing the dyes or additives required for generating those different hues is also increasing. In the separate supply system described above, a separate supply device must be provided for each different masterbatch, and consequently the equipment costs associated with assembling a production line have become extremely expensive. The only way in which to reduce these equipment costs is to reduce the number of supply devices, and consequently the first method described above must be used, wherein a plurality of masterbatch pellets and additional resin pellets are mixed uniformly in a mixer, and this pellet mixture is then supplied to the molding apparatus.

As described above, if a number of different masterbatch pellets are mixed together, then a problem arises in that differences in the shape, size and specific gravity of the different masterbatch pellets, and/or with electrostatic effects, cause the mixture to undergo separation into a non-uniform mixture, with like pellets grouping together. This separation of different masterbatch pellets is particularly marked in those cases where masterbatch pellets with a large difference in specific gravity are mixed together. Pellet separation caused by differences in shape or electrostatic effects can be suppressed to some degree by a method such as regulating the shape and size of the pellets, and adding antistatic agents. However, the specific gravity of any particular type of masterbatch pellets varies depending on the specific additives, dyes or pigments added to the pellets. Accordingly, adjusting the specific gravity of a number of different masterbatch pellets to the same value is problematic.

In order to resolve this problem, a method has been disclosed in which the weight ratio (Wb/Wa) of the average weight (Wb) of a single masterbatch pellet relative to the average weight (Wa) of a single additional resin pellet is set to a value within a range from 0.45 to 0.95 (for example, see Japanese Unexamined Patent Application, First Publication No. Hei 7-102155). However in this method, the average weight of each of the pellets must be set within a specific range, and in order to match the average weights, high specific gravity pellets must be reduced in size, and low specific gravity pellets must be increased in size. Because this leads to the situation where pellets of different specific gravity have different sizes, separation of the pellets can not be adequately prevented. High specific gravity pellets are particularly problematic as their small size means that pellet separation is more marked.

Furthermore, a masterbatch pellet mixture formed from a number of different masterbatch pellets in which the difference between the maximum and minimum apparent specific gravity values of pellets within the mixture is suppressed to no more than 0.5 g/cm$^3$ has also been proposed. In order to adjust the apparent specific gravity values in this manner, a method is disclosed in which a foaming agent or a high specific gravity filler is added to each of the different pellets (for example, see Japanese Unexamined Patent Application, First Publication No. Hei 7-216099). However in this method, in those cases where a foaming agent is added to the masterbatch pellets, molding problems can develop, including the appearance of silver streaking on molded product surfaces (a phenomenon wherein residual gas from the foaming agent occupies space between the molded article and the mold itself, causing streak shaped areas of surface roughness on the surface of the molded product) or the generation of holes in molded films. In contrast, in those cases where a high specific gravity filler is added to the masterbatch pellets, because the high specific gravity filler often comprises a heavy metal, the number of materials that can be added as a high specific gravity filler is reasonably limited due to environmental concerns. Furthermore, the addition of these foaming agents or high specific gravity fillers also affects the hue of the molded product, which is not ideal.

In addition, a method has been disclosed in which the masterbatch pellets and the additional resin pellets are supplied directly, using a quantitative supply device, to the upper section of a screw in the molding apparatus, without undergoing premixing in a blender or mixer (for example, see Japanese Unexamined Patent Application, First Publication No. Hei 11-279282). However in order to ensure uniform supply of the pellets to the molding apparatus, the pellets used in this method must have a shape and size that falls within a specific range, and the difference in specific gravity between pellets must also be minimized. In particular, masterbatch pellets containing added titanium oxide, which has a very large specific gravity, must be restricted to a titanium oxide content within the masterbatch of about no more than 50% by mass in order to enable the difference in specific gravity values between pellets to be small, meaning a loss of freedom in terms of the range of possible compositions.

An object of the present invention is to provide a masterbatch pellet mixture, which when supplied to a molding apparatus, maintains a uniform mixed state and enables stable supply with no separation of the different pellets, even if the masterbatch pellet mixture comprises a mixture of high specific gravity masterbatch pellets and low specific gravity masterbatch pellets, thus enabling the production of a uniform molded product with no compositional irregularities.

SUMMARY OF THE INVENTION

As a result of intensive investigation aimed at resolving the problems described above, the inventors of the present invention discovered that if a masterbatch pellet mixture containing masterbatch pellets with differing specific gravities is separated into high specific gravity pellets and low specific gravity pellets, and the value of the pellet height divided by the bottom surface area is then calculated as a value representative of the elongation of each of the pellets, then provided the difference in this value between the high specific gravity pellets and low specific gravity pellets is held within a constant range, the masterbatch pellet mixture can be provided stably to the molding apparatus with no separation of the pellets, thus enabling the production of a molded product with no compositional irregularities.

A masterbatch pellet mixture of the present invention is a mixture of a high specific gravity masterbatch pellets group (A) with specific gravity within a range from 1.8 to 3.5, and a low specific gravity masterbatch pellets group (B) with specific gravity within a range from 0.5 to 1.6. The high specific gravity masterbatch pellets group (A) comprises m different columnar masterbatch pellets from type 1 through to type m, each with a different specific gravity, and the low specific gravity masterbatch pellets group (B) comprises n different columnar masterbatch pellets from type 1 through to type n, each with a different specific gravity. The high specific gravity masterbatch pellets group (A) and the low specific gravity masterbatch pellets group (B) satisfy the formula (1) shown below.

$$0.5 \ (\text{mm}^{-1}) \leq \sum_{p=1}^{m}\left(\frac{Hp}{Sp} \times Rp\right) - \sum_{q=1}^{n}\left(\frac{Hq}{Sq} \times Rq\right) \leq 12 \ (\text{mm}^{-1}). \quad (1)$$

The symbols in the above formula are defined as follows:
m: an integer from 1 to 10
n: an integer from 1 to 10
p: the type number of columnar masterbatch pellets within the high specific gravity masterbatch pellets group (A)
q: the type number of columnar masterbatch pellets within the low specific gravity masterbatch pellets group (B)
$Hp$: the height (mm) of the columnar masterbatch pellets of type p within the high specific gravity masterbatch pellets group (A)
$Sp$: the bottom surface area ($\text{mm}^2$) of the columnar masterbatch pellets of type p within the high specific gravity masterbatch pellets group (A)
$Rp$: the mass proportion of the mass of the type p columnar masterbatch pellets relative to the total mass of the high specific gravity masterbatch pellets group (A)
$Hq$: the height (mm) of the columnar masterbatch pellets of type q within the low specific gravity masterbatch pellets group (B)
$Sq$: the bottom surface area ($\text{mm}^2$) of the columnar masterbatch pellets of type q within the low specific gravity masterbatch pellets group (B)
$Rq$: the mass proportion of the mass of the type q columnar masterbatch pellets relative to the total mass of the low specific gravity masterbatch pellets group (B)

In those cases where the masterbatch pellets are rectangular parallelepiped or square shaped rods, then at any apex of a pellet, the length of the longest of the three edges that meet at that apex may be deemed the height, and the face comprising the remaining two edges may be deemed the bottom face.

DETAILED DESCRIPTION OF THE INVENTION

The present invention relates to a mixture of high specific gravity masterbatch pellets and low specific gravity masterbatch pellets. More specifically, it relates to a masterbatch pellet mixture, which when supplied to a molding apparatus, maintains a uniform mixed state and enables stable supply with no separation of the different pellets, thus enabling the production of a uniform molded product with no compositional irregularities.

A masterbatch used in the present invention is a thermoplastic resin with a high concentration of a dye, a pigment, another additive and the like dispersed therein, and is made up of columnar (rod shaped) pellets.

Furthermore, a plurality of dyes, pigments and other additives may also be comprised in a single masterbatch used in the present invention. The rods of the present invention may be any shaped column (rod), including circular or cylindrical rods, square or rectangular rods, triangular rods, or polygonal rods. Circular rods and square rods are preferred.

The thermoplastic resin used in the masterbatch described above is preferably either the same type as the additional resin, or co-soluble with the additional resin. Further, the thermoplastic resin is preferably a solid at normal temperatures and is a resin which do not undergo thermal decomposition or thermal deterioration during heating and melting of the masterbatch. Examples of suitable thermoplastic resins include polyolefin resins such as polyethylene, polypropylene, polybutene, polymethylpentene, and polydicylopentadiene; polyvinyl acetate resins; polystyrene resins; polycarbonate resins; polyester resins such as polyethylene terephthalate; polyamide resins; copolymers such as ethylene-propylene copolymers, ethylene-vinyl acetate copolymers, acrylonitrile-butadiene-styrene copolymers, and acrylonitrile-styrene copolymers; and biodegradable resins such as polylactic acid. Other resins can also be used, and there are no particular restrictions provided for the resin when the resin displays good dispersibility of additives, and good co-solubility with the additional resin. The masterbatch may comprise either one such resin, or a combination of two or more different resins.

Furthermore, the additional resin mixed with the masterbatch can utilize the same types of thermoplastic resin as those described above for use in the masterbatch. Furthermore, thermoplastic elastomers, polymer alloys such as ABS-polycarbonate, and thermoplastic composite materials that have been complexed with fillers such as glass fiber or talc can also be used as the additional resin. Either one additional resin, or a combination of two or more different additional resins can be added to the masterbatch.

The dyes or pigments added to the above masterbatch may be dyes, organic pigments or inorganic pigments, and there are no particular restrictions. Examples of suitable dyes include water soluble dyes such as basic dyes and acid dyes; oil soluble dyes such as azo based dyes and perylene based dyes; fluorescent dyes; and functional dyes used in electronic devices. Examples of suitable organic pigments include azo based pigments such as insoluble azo pigments, condensed azo pigments, metal complex azo pigments and benzimidazolone; phthalocyanine based pigments such as phthalocyanine blue and phthalocyanine green, anthraquinone based pigments, indigo based pigments, perylene based pigments, perinone based pigments, quinophthalone based pigments, dioxazine based pigments, quinacridone based pigments, isoindolinone based pigments, metal complex salt based pigments, methine based pigments, azomethine based pigments, and polycyclic pigments such as diketopyrrolopyrrole based pigments. Examples of suitable inorganic pigments include titanium based pigments such as titanium oxide; iron oxide based pigments such as red iron oxide, yellow iron oxide, and black iron oxide; complex oxide based pigments such as cobalt blue and titanium yellow; chromate based pigments such as chrome yellow; sulfide based pigments such as cadmium yellow; silicate based pigments such as ultramarine blue; and carbon black. In addition, functional pigments such as luminous pigments and fluorescent pigments can also be used. These dyes and pigments may be added to the masterbatch either singularly, or in combinations of two or more different materials.

Examples of the types of additives that can be added to the masterbatch include extenders, fillers, dispersants, antioxidants, light stabilizers, slipping agents, antistatic agents, workability assistants, antiblocking agents, ultraviolet absorbers, crystal nucleating agents, foaming agents, antibacterial agents, and flame retarders. These additives may be added to the masterbatch either singularly, or in combinations of two or more different additives.

One example of a method of producing the masterbatch pellets used in the present invention is a strand cut method in which the thermoplastic resin, dyes, pigments and additives required to generate the desired hue and function are mixed together, the resulting mixture is subjected to melt mixing and then fed through an extruder provided with a die head with 5 to 30 die holes of approximate diameter 1 to 5 mm, and the strands discharged from the extruder are then cooled in a water tank, and cut and shaped using a pelletizer. In addition to this type of strand cut method, the masterbatch pellets can also be produced by hot cut methods, sheet cut methods or the like. There are no particular restrictions on the melt mixing device used for melt mixing of the thermoplastic resin with the dyes, pigments and additives, and examples of suitable devices include continuous extrusion devices such as uniaxial extruders and biaxial extruders; batch mixing devices such as Banbury mixers and kneaders; as well as three roll or two roll mills. In the case of a mixing device that is unable to shape the product, the molten mixture is simply shaped by a separate shape forming device such as a extruder ("Feeder ruder" manufactured by Moriyama Company Ltd.) or the like in order to generate the masterbatch pellets.

Examples of masterbatch pellets comprised in the high specific gravity masterbatch pellets group (A) of the present invention, with a specific gravity within a range from 1.8 to 3.5, include those pellets described below. In addition to the pellets described below, any other pellets with a specific gravity within the range from 1.8 to 3.5 can be used within the high specific gravity masterbatch pellets group (A).

Examples of Pellets for the Pellet Group (A)

In the case where a low density polyethylene (specific gravity 0.92) is used as the thermoplastic resin: masterbatch pellets comprising about 65 to 85% by mass of titanium oxide (specific gravity 4.2), about 65 to 85% by mass of titanium yellow (specific gravity 4.5), or about 60 to 80% by mass of red iron oxide (specific gravity 5.2).

In the case where polystyrene (specific gravity 1.05) is used as the thermoplastic resin: masterbatch pellets comprising 55 to 85% by of titanium oxide (specific gravity 4.2), 55 to 85% by mass of titanium yellow (specific gravity 4.5), or 50 to 80% by mass of red iron oxide (specific gravity 5.2).

In the case where polycarbonate (specific gravity 1.19) is used as the thermoplastic resin: masterbatch pellets comprising about 50 to 85% by mass of titanium oxide (specific gravity 4.2), about 50 to 85% by mass of titanium yellow (specific gravity 4.5), or about 45 to 80% by mass of red iron oxide (specific gravity 5.2).

In the case where polyethylene terephthalate (specific gravity 1.39) is used as the thermoplastic resin: masterbatch pellets comprising 35 to 85% by of titanium oxide (specific gravity 4.2), 35 to 85% by mass of titanium yellow (specific gravity 4.5), or 30 to 80% by mass of red iron oxide (specific gravity 5.2).

In contrast, examples of the types of masterbatch pellets that comprise the low specific gravity masterbatch pellets group (B) of the present invention, with a specific gravity within a range from 0.5 to 1.6, include pellets that use any one of the aforementioned resins, that is, low density polyethylene (specific gravity 0.92), polystyrene (specific gravity 1.05), polycarbonate (specific gravity 1.19) or polyethylene terephthalate (specific gravity 1.39) as the thermoplastic resin, and contain an organic pigment (specific gravity 1.6) or carbon black (specific gravity 1.8). These types of masterbatch pellets can be used in the low specific gravity masterbatch pellets group (B) without restricting mixing ratio of components. As described above, the high specific gravity masterbatch pellets group (A), which represents one component of a masterbatch pellet mixture of the present invention, contains at least one type of pellet, and may comprise m different types of pellets, namely from 1 to 10 different types of pellets. Similarly, the low specific gravity masterbatch pellets group (B) containing at least one type of pellet, may comprise n different types of pellets, namely from 1 to 10 different types of pellets. Furthermore, in the present invention, provided the high specific gravity masterbatch pellets group (A) and the low specific gravity masterbatch pellets group (B) satisfy the formula (1) described above, then any mass ratio between the groups is acceptable. However, masterbatch pellet mixtures in which the mass ratio of high specific gravity masterbatch pellets group (A): low specific gravity masterbatch pellets group (B) is within a range from 10:90 to 90:10 are preferred, and mass ratios from 20:80 to 80:20 are even more desirable.

In the above formula (1), the value from the formula (2) shown below is preferably within a range from 1.5 to 13 (mm$^{-1}$), and the value from the formula (3) shown below is preferably within a range from 0.5 to 1.5 (mm$^{-1}$).

$$\sum_{p=1}^{m}\left(\frac{Hp}{Sp} \times Rp\right) \qquad (2)$$

$$\sum_{q=1}^{n}\left(\frac{Hq}{Sq} \times Rq\right) \qquad (3)$$

In the aforementioned formula (1), the height (Hp) of each of the columnar masterbatch pellets within the high specific gravity masterbatch pellets group (A) is preferably within a range from 2.0 to 6.0 mm, the height (Hq) of each of the columnar masterbatch pellets within the low specific gravity masterbatch pellets group (B) is preferably within a range from 0.5 to 3.0 mm, and the bottom surface area values (Sp and Sq) for each of these masterbatch pellets is preferably within a range from 0.1 to 2.3 mm$^2$. The above height (Hq) values are even more preferably within a range from 1 to 1.5 mm.

By ensuring that the masterbatch pellets used in the present invention are of the small sizes defined by the above ranges, compositional irregularities within the molded product can be reduced in comparison with conventionally sized (height: approximately 3 mm, bottom surface area: approximately 7 mm$^2$) masterbatch pellets. Furthermore, by employing these smaller sizes, the mass of an individual pellet drops, enabling improvements in weighing precision, and allowing a more precise mixture, and a greater degree of freedom in terms of the composition of the mixture.

A masterbatch pellet mixture of the present invention can be formed in the same manner as conventional masterbatch pellet mixtures, by mixing the masterbatch pellets with additional resin pellets, and then processing the mixture into a molded product using a molding apparatus. The molding method used can be selected appropriately in accordance with the shape of the target molded product. For example, in the case of molding a plastic film laminate or the like, inflation molding or T-die molding can be used. In the case of molding a pipe or a sash or the like, an extrusion molding method can be used, wherein the molten resin is passed through a specifically shaped die to form a continuous molded product. Furthermore, in the case of molding a product with a complex shape such as a vehicle bumper or a bottle cap, an injection molding method can be used, wherein the molten resin is injected intermittently into the cavity of an opening and closing mold (metal mold). In the case of molding a bottle container or an oil tank or the like, a hollow molding method can be used, wherein a continuously extruded molten resin is inflated using high pressure air.

Furthermore, a masterbatch pellet mixture of the present invention can be reprocessed using a typical masterbatch processing method to form a single masterbatch. There are no particular restrictions on the mixing device used in this masterbatch reprocessing (also known as repelletization). This reprocessing results in an already dispersed masterbatch being mixed for a second time, and consequently even mixing devices with comparatively low mixing power can be used satisfactorily. Examples of suitable mixing devices include continuous extrusion devices such as uniaxial extruders and biaxial extruders; batch mixing devices such as Banbury mixers or kneaders; as well as three roll or two roll mills. In the case of a mixing device that is unable to shape the product, the molten mixture from a feeder ruder or the like is simply shaped by a separate shape forming device in order to generate the masterbatch pellets.

EXAMPLES

As follows is a more detailed description of the present invention using a series of examples, although the present invention is in no way limited by the examples presented below. The unit "parts" used in the preparatory examples and listed in Table 1 to Table 4 refers to a mass referenced value.

Preparation Example 1

Preparation of Masterbatch Pellets Containing Titanium Oxide 70 parts of titanium oxide ("TiPure R-103" manufactured by DuPont Corporation), 5 parts of a low molecular weight polyethylene wax ("Sanwax 161P" manufactured by Sanyo Chemical Industries Ltd.), 25 parts of low density polyethylene ("NUC-8009" manufactured by Nippon Unicar Co., Ltd.), and 0.1 parts of an antioxidant ("Irganox 1076" manufactured by Ciba Specialty Chemicals Inc.) were subjected to melt mixing at 180° C. in a biaxial extruder (die diameter 3.5 mm). The resulting melt mixture was discharged from the die holes as strands, and following cooling of these strands in a water tank, they were cut and shaped using a pelletizer, thus yielding circular columnar masterbatch pellets (white 1 to 15). The thus obtained masterbatch pellets (white 1 to 15) were produced in a variety of sizes by suitable adjustment of the speed of the pelletizer. The sizes and specific gravity values for the various different pellets are shown in Table 1 and Table 2.

Preparation Example 2

Preparation of Masterbatch Pellets Containing Red Iron Oxide 70 parts of the iron oxide based pigment, red iron oxide ("120ED" manufactured by Toda Kogyo Corporation), and 30 parts of a low molecular weight polyethylene wax ("Sanwax 161P" manufactured by Sanyo Chemical Industries Ltd.) were subjected to melt mixing at 120° C. in a kneader. Following further mixing in a three roll mill, the mixture was cooled and crushed, yielding a red iron oxide color base. 57 parts of this red iron oxide color base, 43 parts of low density polyethylene ("NUC-8009" manufactured by Nippon Unicar Co., Ltd.), and 0.1 parts of an antioxidant ("Irganox 1076" manufactured by Ciba Specialty Chemicals Inc.) were subjected to melt mixing at 160° C. in a uniaxial extruder (die diameter 3.0 mm). The resulting melt mixture was discharged from the die holes as strands, and following cooling of these strands in a water tank, they were cut and shaped using a pelletizer, thus yielding circular columnar masterbatch pellets (brown 1 and 2). The thus obtained masterbatch pellets (brown 1 and 2) were produced with different sizes by suitable adjustment of the speed of the pelletizer. The sizes and specific gravity values for the different pellets are shown in Table 1 and Table 2.

Preparation Example 3

Preparation of Masterbatch Pellets Containing a Quinacridone Based Pigment 50 parts of a quinacridone based pigment ("Fastogen Super Red 500RS" manufactured by Dainippon Ink and Chemicals, Inc.), and 50 parts of a low molecular weight polyethylene wax ("Sanwax 161P" manufactured by Sanyo Chemical Industries Ltd.) were subjected to melt mixing at 120° C. in a kneader. Following further mixing in a three roll mill, the mixture was cooled and crushed, yielding a quinacridone color base. 60 parts of this quinacridone color base, 40 parts of low density polyethylene ("NUC-8009" manufactured by Nippon Unicar Co., Ltd.), and 0.1 parts of an antioxidant ("Irganox 1076" manufactured by Ciba Specialty Chemicals Inc.) were subjected to melt mixing at 160° C. in a uniaxial extruder (die diameter 3.0 mm). The resulting melt mixture was discharged from the die holes as strands, and following cooling of these strands in a water tank, they were cut and shaped using a pelletizer, thus yielding circular columnar masterbatch pellets (red 1). The size and specific gravity of the thus obtained masterbatch pellets (red 1) are shown in Table 1 and Table 2.

Preparation Example 4

Preparation of Masterbatch Pellets Containing Carbon Black 30 parts of a carbon black pigment ("MA-100" manufactured by Mitsubishi Chemical Corporation), and 70 parts of a low molecular weight polyethylene wax ("Sanwax 161P" manufactured by Sanyo Chemical Industries Ltd.) were subjected to melt mixing at 120° C. in a kneader, and following further mixing in a three roll mill, the mixture was cooled and crushed, yielding a carbon black color base. 67 parts of this carbon black color base, 33 parts of low density polyethylene ("NUC-8009" manufactured by Nippon Unicar Co., Ltd.), and 0.1 parts of an antioxidant ("Irganox 1076" manufactured by Ciba Specialty Chemicals Inc.) were subjected to melt mixing at 160° C. in a uniaxial extruder (die diameter 3.0 mm). The resulting melt mixture was discharged from the die holes as strands, and following cooling of these strands in a water tank, they were cut and shaped using a pelletizer, thus yielding circular columnar masterbatch pellets (black 1). The size and specific gravity of the thus obtained masterbatch pellets (black 1) are shown in Table 1 and Table 2.

Preparation Example 5

Preparation of Masterbatch Pellets Containing Titanium Oxide 70 parts of titanium oxide ("TiPure R-104" manufactured by DuPont Corporation), 30 parts of a straight chain low density polyethylene powder ("NUCG-4371" manufactured by Nippon Unicar Co., Ltd.), 0.1 parts of an antioxidant ("Irganox 1076" manufactured by Ciba Specialty Chemicals Inc.), 0.05 parts of calcium stearate (calcium stearate, manufactured by Dainippon Ink and Chemicals, Inc.), and 0.1 parts of an antistatic agent ("Electrostripper TS-2" manufactured by Kao Corporation) were subjected to melt mixing at 200° C. in a Farrell continuous mixer. The resulting melt mixture was extruded as strands through the die holes (die diameter 3.0 mm) of a uniaxial extruder at 200° C., and following cooling of these strands in a water tank, they were cut and shaped using a pelletizer, thus yielding circular columnar masterbatch pellets (white 16 to 18). The thus obtained masterbatch pellets (white 16 to 18) were produced in a variety of sizes by suitable adjustment of the speed of the pelletizer. The sizes and specific gravity values for the various different pellets are shown in Table 3.

Preparation Example 6

Preparation of Masterbatch Pellets Containing a Phthalocyanine Based Pigment 55 parts of the phthalocyanine based pigment known as cyanine green ("Fastogen Super Green S" manufactured by Dainippon Ink and Chemicals, Inc.), and 45 parts of a low molecular weight polyethylene wax ("Sanwax 161P" manufactured by Sanyo Chemical Industries Ltd.) were subjected to melt mixing at 120° C. in a kneader, and following further mixing in a three roll mill, the mixture was cooled and crushed, yielding a cyanine green color base. 5.5 parts of this cyanine green color base, 94.5 parts of low density polyethylene ("NUC-8009" manufactured by Nippon Unicar Co., Ltd.), and 0.1 parts of an antioxidant ("Irganox 1076" manufactured by Ciba Specialty Chemicals Inc.) were subjected to melt mixing at 160° C. in a uniaxial extruder (die diameter 3.0 mm). The resulting melt mixture was discharged from the die holes as strands, and following cooling of these strands in a water tank, they were cut and shaped using a pelletizer, thus yielding circular columnar masterbatch pellets (green 1). The size and specific gravity of the thus obtained masterbatch pellets (green 1) are shown in Table 3.

Preparation Example 7

Preparation of Masterbatch Pellets Containing an Isoindoline Based Pigment 50 parts of an isoindoline based pigment ("Graphtol yellow H2R" manufactured by Clariant Corporation), and 50 parts of a low molecular weight polyethylene wax ("Sanwax 161P" manufactured by Sanyo Chemical Industries Ltd.) were subjected to melt mixing at 120° C. in a kneader, and following further mixing in a three roll mill, the mixture was cooled and crushed, yielding a isoindoline color base. 6 parts of this isoindoline color base, 94 parts of low density polyethylene ("NUC-8009" manufactured by Nippon Unicar Co., Ltd.), and 0.1 parts of an antioxidant ("Irganox 1076" manufactured by Ciba Specialty Chemicals Inc.) were subjected to melt mixing at 160° C. in a uniaxial extruder (die diameter 3.0 mm). The resulting melt mixture was discharged from the die holes as strands, and following cooling of these strands in a water tank, they were cut and shaped using a pelletizer, thus yielding circular columnar masterbatch pellets (yellow 1). The size and specific gravity of the thus obtained masterbatch pellets (yellow 1) are shown in Table 3.

Preparation Example 8

Preparation of Masterbatch Pellets Containing Titanium Oxide 70 parts of titanium oxide ("TiPure R-103" manufactured by DuPont Corporation), 30 parts of a polypropylene ("PMA60Z" manufactured by Nippon Polyolefin Co., Ltd.), and 0.1 parts of an antioxidant ("Irganox 1010" manufactured by Ciba Specialty Chemicals Inc.) were subjected to melt mixing at 200° C. in a biaxial extruder (die diameter 3.5 mm). The resulting melt mixture was discharged from the die holes as strands, and following cooling of these strands in a water tank, they were cut and shaped using a pelletizer, thus yielding circular columnar masterbatch pellets (white 19 and 20). The thus obtained masterbatch pellets (white 19 and 20) were produced with different sizes by suitable adjustment of the speed of the pelletizer. The sizes and specific gravity values for the different pellets are shown in Table 4.

Preparation Example 9

Preparation of Masterbatch Pellets Containing Titanium Yellow Pigment 50 parts of the composite oxide pigment known as titanium yellow ("42-118A" manufactured by Ferro Japan Co., Ltd.), 10 parts of a low molecular weight polyethylene wax ("Sanwax 161P" manufactured by Sanyo Chemical Industries Ltd.), 40 parts of a powdered polypropylene ("J604P" manufactured by Sumitomo Mitsui Polyolefin Co., Ltd.), and 0.1 parts of an antioxidant ("AO-80" manufactured by Asahi Denka Co., Ltd.) were subjected to melt mixing at 180° C. in a biaxial extruder (die diameter 4.0 mm). The resulting melt mixture was discharged from the die holes as strands, and following cooling of these strands in a water tank, they were cut and shaped using a pelletizer, thus yielding circular columnar masterbatch pellets (yellow 2 and 3). The thus obtained masterbatch pellets (yellow 2 and 3) were produced with different sizes by suitable adjustment of the speed of the pelletizer. The sizes and specific gravity values for the different pellets are shown in Table 4.

Preparation Example 10

Preparation of Masterbatch Pellets Containing Carbon Black 40 parts of oil furnace carbon black ("MA-100" manufactured by Mitsubishi Chemical Corporation), 60 parts of a low density polyethylene ("J-Rex JF424S" manufactured by Nippon Polyolefin Co., Ltd.), and 1 part of an antioxidant ("Irganox 1076" manufactured by Ciba Specialty Chemicals Inc.) were subjected to melt mixing in a Banbury mixer. This molten mixture was converted to a carbon black color base which were spheres of diameter 3 mm using a feeder ruder type shape forming device. 50 parts of the thus prepared carbon black color base, and 50 parts of low density polyethylene ("J-Rex JF424S" manufactured by Nippon Polyolefin Co., Ltd.) were subjected to melt mixing at 160° C. in a uniaxial extruder (T-die: width 100 mm×thickness 2.5 mm). The resulting melt mixture was discharged from the T-die as a sheet, thus yielding a resin sheet containing carbon black. The sheet was cut with a cutter, using a normal sheet cutting method, yielding square columnar masterbatch pellets (black 2 and 3). The thus obtained masterbatch pellets (black 2 and 3) were produced with different sizes by suitable adjustment of the cutter. The sizes and specific gravity values for the different pellets are shown in Table 4.

Preparation Example 11

Preparation of Masterbatch Pellets Containing Red Iron Oxide 70 parts of the iron oxide based pigment, red iron oxide ("120ED" manufactured by Toda Kogyo Corporation), and 30 parts of a low molecular weight polyethylene wax ("Sanwax 161P" manufactured by Sanyo Chemical Industries Ltd.) were subjected to melt mixing at 120° C. in a kneader, and following further mixing in a three roll mill, the mixture was cooled and crushed, yielding a red iron oxide color base. 5.7 parts of this red iron oxide color base, 94.3 parts of a polypropylene ("PMA60Z" manufactured by Nippon Polyolefin Co., Ltd.), and 0.1 parts of an antioxidant ("Irganox 1010" manufactured by Ciba Specialty Chemicals Inc.) were subjected to melt mixing at 200° C. in a uniaxial extruder (die diameter 3.0 mm). The resulting melt mixture was discharged from the die holes as strands, and following cooling of these strands in a water tank, they were cut and shaped using a pelletizer, thus yielding circular columnar masterbatch pellets (brown 3 and 4). The thus obtained masterbatch pellets (brown 3 and 4) were produced with different sizes by suitable adjustment of the speed of the pelletizer. The sizes and specific gravity values for the different pellets are shown in Table 4.

Preparation Example 12

Preparation of Masterbatch Pellets Containing an Antioxidant 10 parts of an antioxidant ("PEP-36" manufactured by Asahi Denka Co., Ltd.), 90 parts of a low density polyethylene ("PES-20" manufactured by Nippon Unicar Co., Ltd.), and 0.1 parts of an antioxidant ("Irganox 1010" manufactured by Ciba Specialty Chemicals Inc.) were subjected to melt mixing at 150° C. in a biaxial extruder (die diameter 3.5 mm). The resulting melt mixture was discharged from the die holes as strands, and following cooling of these strands in a water tank, they were cut and shaped using a pelletizer, thus yielding circular columnar masterbatch pellets (antioxidant 1 and 2). The thus obtained masterbatch pellets (antioxidant 1 and 2) were produced with different sizes by suitable adjustment of the speed of the pelletizer. The sizes and specific gravity values for the different pellets are shown in Table 4.

Preparation Example 13

Preparation of Masterbatch Pellets Containing a Light Stabilizer 10 parts of a light stabilizer ("Sanol LS-770" manufactured by Sankyo Kasei Co., Ltd.), 90 parts of a low density polyethylene ("PES-20" manufactured by Nippon Unicar Co., Ltd.), and 0.1 parts of an antioxidant ("Irganox 1010" manufactured by Ciba Specialty Chemicals Inc.) were subjected to melt mixing at 150° C. in a biaxial extruder (die diameter 3.5 mm). The resulting melt mixture was discharged from the die holes as strands, and following cooling of these strands in a water tank, they were cut and shaped using a pelletizer, thus yielding circular columnar masterbatch pellets (light stabilizer 1 and 2). The thus obtained masterbatch pellets (light stabilizer 1 and 2) were produced with different sizes by suitable adjustment of the speed of the pelletizer. The sizes and specific gravity values for the different pellets are shown in Table 4.

Examples 1 to 9 and Comparative Examples 1 to 7

Masterbatch pellet mixtures were prepared by combining the masterbatch pellets prepared in each of the preparatory examples described above in the quantities shown in Table 1 and Table 2, and then mixing the resulting mixtures in a tumbler type mixer.

Examples 10, 11 and Comparative Example 8

Masterbatch pellet mixtures were prepared by combining the masterbatch pellets prepared in each of the preparatory examples described above in the quantities shown in Table 3, and then mixing the resulting mixtures in a tumbler type mixer.

Example 12 and Comparative Examples 9 and 10

Masterbatch pellet mixtures were prepared by combining the masterbatch pellets prepared in each of the preparatory examples described above in the quantities shown in Table 4, and then mixing the resulting mixtures in a tumbler type mixer.

(1) Method of Evaluating Examples 1 to 9 and Comparative Examples 1 to 7

(1-1) Preparation of Sheets for Evaluating Pellet Separation

Each of the masterbatch pellet mixtures obtained in the aforementioned examples 1 to 9 and the comparative examples 1 to 7 was placed in the hopper of a volumetric automated supply device ("MB mini E" manufactured by Sangyokiden Co., Ltd.), and the device was operated at a supply rate of approximately 1.5 kg/hour. The masterbatch pellet mixture discharged from this supply device was collected for two separate 5 minute periods, at 10 minutes and then 50 minutes were passed after the commencement of supply. Each of these masterbatch pellet mixture samples was mixed for 3 minutes in a two roll mill heated to 160° C., and was then used to prepare a 1 mm thick sheet in a compression molding device heated to 180° C.

(1-2) Evaluation of Pellet Separation

The chromaticity of the sheet prepared from the sample collected 10 minutes after the commencement of supply and the sheet prepared from the sample collected 50 minutes after the commencement of supply were measured using a spectrocolorimeter ("CM-2002" manufactured by Minolta Corporation). Then, using the chromaticity of the sheet prepared from the sample collected 10 minutes after the commencement of supply as a standard, the color difference $\Delta E^*$, which was a difference between the chromaticity of the sheet prepared from the sample collected 10 minutes after and the chromaticity of the sheet prepared from the sample collected 50 minutes after the commencement of supply, was determined. The value of this color difference $\Delta E^*$ was evaluated in accordance with the following criteria as an indication of the level of pellet separation. Smaller color difference $\Delta E^*$ values are preferred.

O: color difference $\Delta E^*$ less than 2, x: color difference $\Delta E^*$ at least 2

(O represents a favorable result, and x represents a poor result)

(2) Evaluation of Examples 10, 11 and Comparative Example 8

(2-1) Preparation of Films for Evaluating Pellet Separation

Using a loss-in-weight automated supply device ("F-250" manufactured by Sangyokiden Co., Ltd.), the masterbatch pellet mixture prepared in the example 10 or 11, or the comparative example 8, and a high density polyethylene ("KFY51A" manufactured by manufactured by Nippon Polyolefin Co., Ltd.) that functions as the additional resin were supplied to an inflation molding device (manufactured by Modern Corp., screw diameter 40 mm) at supply rates of 0.5 kg/hour and 10 kg/hour respectively. The speed of the inflation film rolling device was adjusted to produce a film of thickness 30 μm and width 30 cm. For the purposes of evaluation, film samples were collected at 5 minutes, 30 minutes, and then 50 minutes after the commencement of film molding.

(2-2) Evaluation of Pellet Separation

The chromaticity of each of the film samples was measured using a spectrocolorimeter ("CM-2002" manufactured by Minolta Corporation). Then, the color difference $\Delta E^*$ was determined between the average value of the chromaticity across the three film samples collected at 5 minutes, 30 minutes and then 50 minutes after the commencement of molding, and the chromaticity of the film sample collected 50 minutes after the commencement of supply. The value of this color difference $\Delta E^*$ was evaluated in accordance with the following criteria as an indication of the level of pellet separation.

O: color difference $\Delta E^*$ less than 2, x: color difference $\Delta E^*$ at least 2

(3) Evaluation of Example 12 and Comparative Examples 9, 10

(3-1) Preparation of Molded Products for Evaluating Pellet Separation

A masterbatch pellet mixture prepared in the example 12, the comparative example 9, and the comparative example 10 was subjected to melt mixing at 200° C. in a uniaxial extruder (die diameter: 3.0 mm) equipped with a full flight screw. The resulting molten mixture was discharged from the die holes as strands at a discharge rate of 10 kg/hour, and following cooling of these strands in a water tank, they were cut and shaped using a pelletizer, thus yielding circular columnar colored masterbatch pellets of height 3.2 mm and diameter 3.2 mm. During this process, 100 g samples of the colored masterbatch pellets were collected at 10 minutes, 20 minutes, 30 minutes, 40 minutes, and then 50 minutes after the commencement of production of the colored masterbatch pellets. 20 g samples were then taken from the colored masterbatch pellet samples collected at each of the five different times, and the combination produced by mixing these five 20 g samples was used as the standard colored masterbatch pellets.

Subsequently, a mixture was prepared containing 3 parts of the colored masterbatch pellets collected 50 minutes after the commencement of production of the colored masterbatch pellets, and 100 parts of polypropylene ("J604" manufactured by Sumitomo Mitsui Polyolefin Co., Ltd.), and this mixture was used to form a molded product of dimensions 55×90×2 mm, using an injection molding apparatus ("MSS50" manufactured by Mitsubishi Heavy Industries Ltd.). Furthermore, using a similar operation, a molded product was also produced using a mixture containing 3 parts of the standard colored masterbatch pellets prepared above, and 100 parts of polypropylene ("J604" manufactured by Sumitomo Mitsui Polyolefin Co., Ltd.).

(3-2) Evaluation of Pellet Separation

The chromaticity of the molded product produced using the colored masterbatch pellets collected 50 minutes after the commencement of production of the colored masterbatch pellets, and the molded product produced using the standard colored masterbatch pellets were measured using a spectro-colorimeter ("CM-2002" manufactured by Minolta Corporation). Then, the color difference ΔE* was determined between the chromaticity of the molded product produced using the standard colored masterbatch pellets, and the chromaticity of the molded product produced using the colored masterbatch pellets collected 50 minutes after the commencement of production of the colored masterbatch pellets. The value of this color difference ΔE* was evaluated in accordance with the following criteria as an indication of the level of pellet separation. O: color difference ΔE* less than 2, x: color difference ΔE* at least 2

The evaluation results for the examples 1 to 9 are shown in Table 1, the evaluation results for the comparative examples 1 to 7 are shown in Table 2, the evaluation results for the examples 10, 11 and the comparative example 8 are shown in Table 3, and the evaluation results for the example 12 and the comparative examples 9, 10 are shown in Table 4.

TABLE 1

| Masterbatch pellets type | | height (H) (mm) | diameter (mm) | bottom surface area (S) (mm²) | H/S (mm⁻¹) | specific gravity | Example 1 | Example 2 | Example 3 | Example 4 | Example 5 | Example 6 | Example 7 | Example 8 | Example 9 |
|---|---|---|---|---|---|---|---|---|---|---|---|---|---|---|---|
| High specific gravity masterbatch pellets group (A) | white 1 | 2.0 | 0.5 | 0.20 | 10.19 | 1.96 | 50 parts (10.19) | | | | | | | | |
| | white 2 | 2.0 | 1.0 | 0.79 | 2.55 | 1.96 | | 50 parts (2.55) | | | | | | | |
| | white 3 | 3.0 | 1.0 | 0.79 | 3.82 | 1.96 | | | 50 parts (3.82) | | | | | | |
| | white 4 | 4.0 | 1.0 | 0.79 | 5.09 | 1.96 | | | | 50 parts (5.09) | | | | | |
| | white 5 | 5.0 | 1.0 | 0.79 | 6.37 | 1.96 | | | | | 50 parts (6.37) | | | | |
| | white 6 | 6.0 | 1.0 | 0.79 | 7.64 | 1.96 | | | | | | 50 parts (7.64) | | | |
| | white 7 | 3.0 | 1.5 | 1.77 | 1.70 | 1.96 | | | | | | | 50 parts (1.70) | | |
| | white 8 | 4.5 | 1.5 | 1.77 | 2.55 | 1.96 | | | | | | | | 50 parts (2.55) | |
| | white 9 | 6.0 | 1.5 | 1.77 | 3.40 | 1.96 | | | | | | | | | 50 parts (3.40) |
| | total mass of high specific gravity masterbatch pellets group (A) | | | | | | 50 parts | 50 parts | 50 parts | 50 parts | 50 parts | 50 parts | 50 parts | 50 parts | 50 parts |
| | Σ(Hp/Sp) × Rp for high specific gravity masterbatch pellets group (A) | | | | | | 10.19 | 2.55 | 3.82 | 5.09 | 6.37 | 7.64 | 1.70 | 2.55 | 3.40 |
| Low specific gravity masterbatch pellets group (B) | brown 1 | 1.2 | 1.2 | 1.13 | 1.06 | 1.37 | 40 parts (0.85) | 40 parts (0.85) | 40 parts (0.85) | 40 parts (0.85) | 40 parts (0.85) | 40 parts (0.85) | 40 parts (0.85) | 40 parts (0.85) | 40 parts (0.85) |
| | red 1 | 1.0 | 1.0 | 0.79 | 1.27 | 1.03 | 5 parts (0.13) | 5 parts (0.13) | 5 parts (0.13) | 5 parts (0.13) | 5 parts (0.13) | 5 parts (0.13) | 5 parts (0.13) | 5 parts (0.13) | 5 parts (0.13) |
| | black 1 | 1.2 | 1.2 | 1.13 | 1.06 | 1.02 | 5 parts (0.11) | 5 parts (0.11) | 5 parts (0.11) | 5 parts (0.11) | 5 parts (0.11) | 5 parts (0.11) | 5 parts (0.11) | 5 parts (0.11) | 5 parts (0.11) |
| | total mass of low specific gravity masterbatch pellets group (B) | | | | | | 50 parts | 50 parts | 50 parts | 50 parts | 50 parts | 50 parts | 50 parts | 50 parts | 50 parts |
| | Σ(Hq/Sq) × Rq for low specific gravity masterbatch pellets group (B) | | | | | | 1.09 | 1.09 | 1.09 | 1.09 | 1.09 | 1.09 | 1.09 | 1.09 | 1.09 |
| | Value of formula (1) (mm⁻¹) | | | | | | 9.10 | 1.46 | 2.73 | 4.00 | 5.28 | 6.55 | 0.61 | 1.46 | 2.31 |
| Evaluation Results | color difference ΔE* | | | | | | 1.6 | 1.3 | 0.6 | 0.8 | 1.7 | 1.3 | 0.3 | 0.4 | 1.5 |
| | pellet separation | | | | | | O | O | O | O | O | O | O | O | O |

TABLE 2

| Masterbatch pellets type | | height (H) (mm) | diameter (mm) | bottom surface area (S) (mm²) | H/S (mm⁻¹) | specific gravity | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| High specific gravity masterbatch pellets group (A) | white 10 | 3.0 | 0.5 | 0.20 | 15.28 | 1.96 | 50 parts (15.28) | | | | | | |
| | white 11 | 1.0 | 1.0 | 0.79 | 1.27 | 1.96 | | 50 parts (1.27) | | | | | 50 parts (1.27) |
| | white 12 | 2.0 | 1.5 | 1.77 | 1.13 | 1.96 | | | 50 parts (1.13) | | | | |
| | white 13 | 2.0 | 2.0 | 3.14 | 0.64 | 1.96 | | | | 50 parts (0.64) | | | |
| | white 14 | 4.0 | 2.0 | 3.14 | 1.27 | 1.96 | | | | | 50 parts (1.27) | | |
| | white 15 | 3.0 | 3.0 | 7.07 | 0.42 | 1.96 | | | | | | 50 parts (0.42) | |
| total mass of high specific gravity masterbatch pellets group (A) | | | | | | | 50 parts | 50 parts | 50 parts | 50 parts | 50 parts | 50 parts | 50 parts |
| Σ(Hp/Sp) × Rp for high specific gravity masterbatch pellets group (A) | | | | | | | 15.28 | 1.27 | 1.13 | 0.64 | 1.27 | 0.42 | 1.27 |
| Low specific gravity masterbatch pellets group (B) | brown 1 | 1.2 | 1.2 | 1.13 | 1.06 | 1.37 | 40 parts (0.85) | 40 parts (0.85) | 40 parts (0.85) | 40 parts (0.85) | 40 parts (0.85) | | |
| | brown 2 | 3.0 | 1.2 | 1.13 | 2.65 | 1.37 | | | | | | 40 parts (2.12) | 40 parts (2.12) |
| | red 1 | 1.0 | 1.0 | 0.79 | 1.27 | 1.03 | 5 parts (0.13) | 5 parts (0.13) | 5 parts (0.13) | 5 parts (0.13) | 5 parts (0.13) | 5 parts (0.13) | 5 parts (0.13) |
| | black 1 | 1.2 | 1.2 | 1.13 | 1.06 | 1.02 | 5 parts (0.11) | 5 parts (0.11) | 5 parts (0.11) | 5 parts (0.11) | 5 parts (0.11) | 5 parts (0.11) | 5 parts (0.11) |
| total mass of low specific gravity masterbatch pellets group (B) | | | | | | | 50 parts | 50 parts | 50 parts | 50 parts | 50 parts | 50 parts | 50 parts |
| Σ(Hq/Sq) × Rq for low specific gravity masterbatch pellets group (B) | | | | | | | 1.09 | 1.09 | 1.09 | 1.09 | 1.09 | 2.36 | 2.36 |
| Value of formula (1) (mm⁻¹) | | | | | | | 14.19 | 0.18 | 0.04 | −0.45 | 0.18 | −1.94 | −1.09 |
| Evaluation Results | | | color difference ΔE* | | | | 3.4 | 5.5 | 4.8 | 2.8 | 3.8 | 5.4 | 5.4 |
| | | | pellet separation | | | | x | x | x | x | x | x | x |

TABLE 3

| Masterbatch pellets type | | height (H) (mm) | diameter (mm) | bottom surface area (S)(mm²) | H/S (mm⁻¹) | specific gravity | Example 10 | Example 11 | Comparative Example 8 |
|---|---|---|---|---|---|---|---|---|---|
| High specific gravity masterbatch pellets group (A) | white 16 | 3.0 | 1.2 | 1.13 | 2.65 | 1.98 | 80 parts (2.65) | | |
| | white 17 | 4.5 | 1.2 | 1.13 | 3.98 | 1.98 | | 80 parts (3.98) | |
| | white 18 | 1.2 | 1.2 | 1.13 | 1.06 | 1.98 | | | 80 parts (1.06) |
| total mass of high specific gravity masterbatch pellets group (A) | | | | | | | 80 parts | 80 parts | 80 parts |
| Σ(Hp/Sp) × Rp for high specific gravity masterbatch pellets group (A) | | | | | | | 2.65 | 3.98 | 1.06 |
| Low specific gravity masterbatch | green 1 | 1.0 | 1.0 | 0.79 | 1.27 | 0.93 | 10 parts (0.64) | 10 parts (0.64) | 10 parts (0.64) |

TABLE 3-continued

Size and specific gravity of masterbatch pellets

| Masterbatch pellets type | | height (H) (mm) | diameter (mm) | bottom surface area (S)(mm²) | H/S (mm⁻¹) | specific gravity | Example 10 | Example 11 | Comparative Example 8 |
|---|---|---|---|---|---|---|---|---|---|
| pellets group (B) | yellow 1 | 1.2 | 1.2 | 1.13 | 1.06 | 0.93 | 10 parts (0.53) | 10 parts (0.53) | 10 parts (0.53) |
| | total mass of low specific gravity masterbatch pellets group (B) | | | | | | 20 parts | 20 parts | 20 parts |
| | Σ(Hq/Sq) × Rq for low specific gravity masterbatch pellets group (B) | | | | | | 1.17 | 1.17 | 1.17 |
| | Value of formula (1) (mm⁻¹) | | | | | | 1.48 | 2.81 | −0.11 |
| Evaluation Results | color difference ΔE* | | | | | | 1.7 | 0.8 | 2.9 |
| | pellet separation | | | | | | O | O | x |

TABLE 4

Size and specific gravity of masterbatch pellets

| | Masterbatch pellets type | height (H) (mm) | diameter (mm) | length (mm) | breadth (mm) | bottom surface area (S) (mm²) | H/S (mm⁻¹) | specific gravity | Example 12 | Comparative Example 9 | Comparative Example 10 |
|---|---|---|---|---|---|---|---|---|---|---|---|
| High specific gravity masterbatch pellets group (A) | white 19 | 1.0 | 1.0 | — | — | 0.79 | 1.27 | 2.00 | | 20 parts (1.27) | 20 parts (1.27) |
| | white 20 | 3.0 | 1.0 | — | — | 0.79 | 3.82 | 2.00 | 20 parts (3.82) | | |
| | total mass of high specific gravity masterbatch pellets group (A) | | | | | | | | 20 parts | 20 parts | 20 parts |
| | Σ(Hp/Sp) × Rp for high specific gravity masterbatch pellets group (A) | | | | | | | | 3.82 | 1.27 | 1.27 |
| Low specific gravity masterbatch pellets group (B) | yellow 2 | 1.0 | 1.2 | — | — | 1.13 | 0.88 | 1.53 | 4 parts (0.07) | 4 parts (0.07) | |
| | yellow 3 | 4.0 | 1.2 | — | — | 1.13 | 3.54 | 1.53 | | | 4 parts (0.27) |
| | black 2 | 1.2 | — | 1.2 | 1.5 | 1.80 | 0.67 | 1.01 | 15 parts (0.19) | 15 parts (0.19) | |
| | black 3 | 3.0 | — | 1.2 | 1.5 | 1.80 | 1.67 | 1.01 | | | 15 parts (0.48) |
| | brown 3 | 1.2 | 1.2 | — | — | 1.13 | 1.06 | 0.95 | 3 parts (0.06) | 3 parts (0.06) | |
| | brown 4 | 4.0 | 1.2 | — | — | 1.13 | 3.54 | 0.95 | | | 3 parts (0.20) |
| | antioxidant 1 | 1.2 | 1.2 | — | — | 1.13 | 1.06 | 1.01 | 15 parts (0.31) | 15 parts (0.31) | |
| | antioxidant 2 | 4.0 | 1.2 | — | — | 1.13 | 3.54 | 1.01 | | | 15 parts (1.02) |
| | light stabilizer 1 | 1.2 | 1.2 | — | — | 1.13 | 1.06 | 1.01 | 15 parts (0.31) | 15 parts (0.31) | |
| | light stabilizer 2 | 4.0 | 1.2 | — | — | 1.13 | 3.54 | 1.01 | | | 15 parts (1.02) |
| | total mass of low specific gravity masterbatch pellets group (B) | | | | | | | | 52 parts | 52 parts | 52 parts |
| | Σ(Hq/Sq) × Rq for low specific gravity masterbatch pellets group (B) | | | | | | | | 0.94 | 0.94 | 2.99 |
| | Value of formula (1) (mm⁻¹) | | | | | | | | 2.88 | 0.33 | −1.72 |
| Evaluation Results | color difference ΔE* | | | | | | | | 0.1 | 9.5 | 12.5 |
| | pellet separation | | | | | | | | O | x | x |

The values displayed in the brackets beneath the quantities of each of the masterbatch pellets shown in Table 1 through Table 4 are the values for (Hp/Sp)×Rp or (Hq/Sq)×Rq for that particular masterbatch pellet.

From the evaluation results shown in Table 1 it is evident that the masterbatch pellet mixtures of the examples 1 to 9, which satisfy the formula (1) presented above, display relatively little color variation over time when supplied by an automatic supply device. From this observation, it is clear that masterbatch pellet mixtures that satisfy the formula (1) can be supplied to a molding apparatus with good stability and no separation of the pellets, enabling the production of a molded product with uniform composition.

From the evaluation results of Table 2 it is evident that the masterbatch pellet mixtures of the comparative examples 1 to 7, which do not satisfy the formula (1) presented above, display a large degree of color variation over time when supplied by an automatic supply device. From this observation, it is clear that masterbatch pellet mixtures that do not satisfy the formula (1) undergo pellet separation and are unable to be supplied stably to a molding apparatus, meaning the production of a molded product with uniform composition is impossible.

From the evaluation results shown in Table 3 it is evident that the films formed using the masterbatch pellet mixtures of the examples 10 and 11, which satisfy the formula (1), display relatively little color variation over molding time. From this observation, it is clear that masterbatch pellet mixtures that satisfy the formula (1) can be supplied to a molding apparatus with good stability and no separation of the pellets, enabling the production of a film with uniform composition.

In contrast, the film formed using the masterbatch pellet mixture of the comparative example 8, which does not satisfy the formula (1), displays a large degree of color variation over molding time. From this observation it is clear that masterbatch pellet mixtures that do not satisfy the formula (1) undergo pellet separation and are unable to be supplied stably to a molding apparatus, meaning the production of a film of uniform composition is impossible.

From the evaluation results shown in Table 4 it is evident that using the masterbatch pellet mixture of the example 12, which satisfies the formula (1), even colored masterbatch pellets that are prepared using a uniaxial extruder equipped with a full flight screw with relatively weak mixing power display relatively little color variation over molding time. From this observation it is clear that a masterbatch pellet mixture that satisfies the formula (1) can be supplied to an extruder with good stability and no separation of the pellets, enabling the production of colored masterbatch pellets or molded products of uniform composition.

In contrast, the colored masterbatch pellets prepared using the masterbatch pellet mixtures of the comparative examples 9 and 10, which do not satisfy the formula (1), display a large degree of color variation over molding time. From this observation it is clear that masterbatch pellet mixtures that do not satisfy the formula (1) undergo pellet separation and are unable to be supplied stably to an extruder, meaning the production of colored masterbatch pellets or molded products of uniform composition is impossible.

INDUSTRIAL APPLICABILITY

A masterbatch pellet mixture of the present invention provides a mixture of high specific gravity masterbatch pellets and low specific gravity masterbatch pellets, which is capable of producing a uniform molded product with no compositional irregularities.

In other words, when supplied to a molding apparatus, a masterbatch pellet mixture of the present invention maintains a uniform mixed state and enables stable supply with no separation of the different pellets, even if the masterbatch pellet mixture comprises a mixture of high specific gravity masterbatch pellets and low specific gravity masterbatch pellets, thus enabling the production of a uniform molded product with no compositional irregularities. For this reason, the present invention is useful as a raw material for the production of colored masterbatch pellets, which can yield no compositional irregularities, and the production of plastic molded products with excellent external appearance.

In addition, in a masterbatch pellet mixture of the present invention, even in those cases where a high specific gravity component is added to the masterbatch, because the specific gravity of the pellets is reduced, there is no necessity to suppress the quantity added of the high specific gravity component. Accordingly, the present invention offers another advantage in that it does not limit the compositional degree of freedom. Furthermore, because a high concentration masterbatch can be used, the present invention also offers the advantage that the quantity of the masterbatch added to the additional resin can be reduced.

What is claimed is:

1. A masterbatch pellet mixture comprising a mixture of a high specific gravity masterbatch pellets group (A) with specific gravity within a range from 1.8 to 3.5, and a low specific gravity masterbatch pellets group (B) with specific gravity within a range from 0.5 to 1.6, wherein the high specific gravity masterbatch pellets group (A) comprises m different columnar masterbatch pellets from type 1 through to type m, each with a different specific gravity, the low specific gravity masterbatch pellets group (B) comprises n different columnar masterbatch pellets from type 1 through to type n, each with a different specific gravity, and the high specific gravity masterbatch pellets group (A) and the low specific gravity masterbatch pellets group (B) satisfy a formula (1) shown below:

$$0.5 \ (\text{mm}^{-1}) \leq \sum_{p=1}^{m} \left(\frac{Hp}{Sp} \times Rp\right) - \sum_{q=1}^{n} \left(\frac{Hq}{Sq} \times Rq\right) \leq 12 \ (\text{mm}^{-1}). \quad (1)$$

wherein symbols in the formula are defined as follows:
  m: an integer from 1 to 10
  n: an integer from 1 to 10
  p: a type number of columnar masterbatch pellets within the high specific gravity masterbatch pellets group (A)
  q: a type number of columnar masterbatch pellets within the low specific gravity masterbatch pellets group (B)
  Hp: a height (mm) of columnar masterbatch pellets of type p within the high specific gravity masterbatch pellets group (A)
  Sp: a bottom surface area (mm$^2$) of columnar masterbatch pellets of type p within the high specific gravity masterbatch pellets group (A)
  Rp: a mass proportion of the mass of the type p columnar masterbatch pellets relative to a total mass of the high specific gravity masterbatch pellets group (A)
  Hq: a height (mm) of columnar masterbatch pellets of type q within the low specific gravity masterbatch pellets group (B)
  Sq: a bottom surface area (mm$^2$) of columnar masterbatch pellets of type q within the low specific gravity masterbatch pellets group (B)

Rq: a mass proportion of the mass of the type q columnar masterbatch pellets relative to a total mass of the low specific gravity masterbatch pellets group (B).

2. A masterbatch pellet mixture according to claim 1, wherein a value of a formula (2) is within a range from 1.5 to 13 (mm$^{-1}$), and a value of a formula (3) is within a range from 0.5 to 1.5 (mm$^{-1}$)

$$\sum_{p=1}^{m}\left(\frac{Hp}{Sp}\times Rp\right) \quad (2)$$

$$\sum_{q=1}^{n}\left(\frac{Hq}{Sq}\times Rq\right) \quad (3)$$

3. A masterbatch pellet mixture according to claim 1, wherein the Hp is within a range from 2.0 to 6.0 mm, the Hq is within a range from 1.0 to 3.0 mm, and values for both the Sp and the Sq are within a range from 0.1 to 2.3 mm$^2$.

* * * * *